United States Patent [19]
Ota et al.

[11] Patent Number: 6,136,750
[45] Date of Patent: Oct. 24, 2000

[54] THERMAL RECORDING MEDIA AND VOID-CONTAINING POLYOLEFIN FILMS FOR USE THEREIN

[75] Inventors: Saburo Ota; Ichiro Kitaura; Atsushi Taga; Yoshifumi Yamamoto, all of Inuyama, Japan

[73] Assignee: Toyo Boseki Kabushiki Kaisha, Osaka-fu, Japan

[21] Appl. No.: 09/196,940

[22] Filed: Nov. 20, 1998

[30] Foreign Application Priority Data

Nov. 26, 1997 [JP] Japan .................................. 9-324290

[51] Int. Cl.⁷ ...................................................... B41M 5/40
[52] U.S. Cl. .......................................... 503/200; 428/304.4
[58] Field of Search .................................... 427/150–152; 503/200, 226; 428/304.4, 910

[56] References Cited

U.S. PATENT DOCUMENTS

| | | | |
|---|---|---|---|
| 3,773,608 | 11/1973 | Yoshimura et al. | 161/168 |
| 5,115,254 | 5/1992 | Onishi et al. | 346/76 |
| 5,489,471 | 2/1996 | Inoue et al. | 428/304.4 |

FOREIGN PATENT DOCUMENTS

| | | |
|---|---|---|
| 0 345 419 | 12/1989 | European Pat. Off. . |
| 0 552 656 | 7/1993 | European Pat. Off. . |
| 06328848 | 11/1994 | Japan . |

OTHER PUBLICATIONS

Patent Abstracts of Japan, vol. 096, No. 002, Feb. 29 1996 & JP 07 278330 A (Toyobo Co Ltd), Oct. 24, 1995, abstract only.

Patent Abstracts of Japan, vol. 096, No. 009, Sep. 1996 & JP 08 132746 A (Toyobo Co Ltd), May 28, 1996, abstract only.

Patent Abstracts of Japan, vol. 097, No. 010, Oct. 31, 1997 & JP 09 150583 A (Ricoh Co Ltd), Jun. 10 1997, abstract only.

*Primary Examiner*—Bruce H. Hess
*Attorney, Agent, or Firm*—Morrison & Foerster LLP

[57] ABSTRACT

Thermal recording media each having as a support or a part thereof, a void-containing polyolefin film with a void volume of from 10 cc to smaller than 40 cc per 100 g of the film. The thermal recording media can attain the excellent advantages that they have high resolving power, they can give high-density and distinct images recorded even with very small printing energy, they have high delamination resistance, i.e., they are not easily delaminated by adhesive tape or others, and they have high opacifying power and high elasticity.

3 Claims, No Drawings

THERMAL RECORDING MEDIA AND VOID-CONTAINING POLYOLEFIN FILMS FOR USE THEREIN

FILED OF INVENTION

The present invention relates to thermal recording media having high resolving power, capable of giving high-density and distinct recorded images, and having high delamination resistance, and it also relates to void-containing polyolefin films for use therein.

BACKGROUND OF THE INVENTION

The conventional thermal recording media may include those which each has a thermosensitive recording layer disposed on a substrate as may be made of paper. In the thermosensitive recording layer are contained a color-forming agent and a color-developing agent causing color development by contact with the color-forming agent, and color developed images can be obtained by heating with a thermal pen, thermal head, or other means.

The thermal recording media of this type have been widely used as the recording media for facsimiles, various calculators, medical instruments, computers, thermal copying machines, and printers of other various instruments.

The advance of various office instruments and diversification of their applications are making rapid progress, and there has been a demand for the development of thermal recording media according to the respective requests. For example, thermal recording media suitable for the speed improvement of recording instruments are required to give high-density and distinct images recorded even with very low printing energy. It has become recognized that the study of various substrates as well as thermosensitive recording layers is needed for complying with the requirement. Therefore, cases are gradually increasing where synthetic paper or synthetic resin films are used in place of conventional natural paper.

As the means of fitting a decrease in printing energy involved in the speed improvement of printing, for example, JP-A-63299976 teaches the use of synthetic paper with a density of 0.9 g/cm$^3$ or lower, e.g., 0.77 g/cm$^3$, as a substrate for the sensitivity improvement of thermal recording materials. JP-A-05058028 and JP-A-05058029 teach, for the purpose of obtaining high sensitive thermal recording materials, the use of a polypropylene substrate with a density of from 0.6 to 0.8 g/cm$^3$, on which surface with a Beck smoothness of 800 seconds or higher a recording layer is disposed, and the use of a microvoid-containing white-colored polyester as a substrate, respectively. In addition, JP-A-02302887 teaches laminating a plastic film with a density of from 0.5 to 0.8 g/cm$^3$ on the base layer of paper in thermal recording sheets for the purpose of improving the degree of close contact with recording heads and preventing the curling of sheets. Furthermore, JP-A-09095056 teaches, for the purpose of obtaining high sensitive thermal recording materials, a synthetic resin sheet with a density of from 0.2 to 0.5 g/cm$^3$.

These means, however, cannot have sufficient heat sensitivity and satisfactory delamination resistance.

SUMMARY OF THE INVENTION

Under these circumstances, the present inventors have intensively studied various substrates in particular for the purpose of obtaining thermal recording media which have high resolving power, can give high-density and distinct images recorded even with very small printing energy, and have high delamination resistance. As a result, they have found that the use of a void-containing polyolefin film with a specific void volume as a substrate or a part thereof, on which substrate a thermosensitive recording layer is disposed, makes it possible to obtain thermal recording media capable of giving high-density and distinct images even for those with very fine image quality and having high delamination resistance, i.e., not easily delaminated by adhesive tapes or others, thereby completing the present invention.

Thus the present invention provides a thermal recording medium in which a thermosensitive recording layer is disposed on a substrate having a void-containing polyolefin film with a void volume of from 10 cc to smaller than 40 cc per 100 g of the film.

The polyolefin film may preferably be made by preparing an unoriented film composed mainly of a polyolefin and a substance incompatible with the polyolefin and biaxially stretching the unoriented film, and it can provide thermal recording media particularly having high resolving power, high delamination resistance, and high elasticity.

The use of inorganic fine particles as the substance incompatible with the polyolefin makes it easy to adjust the void volume and also makes it possible to reduce the cost of film preparation.

DETAILED DESCRIPTION OF THE INVENTION

The thermal recording media of the present invention can attain the excellent advantages as described above. This is due to the heat-insulating and cushioning properties of a void-containing polyolefin film as a substrate or a part thereof, on which substrate a thermosensitive recording layer is disposed. Therefore, the image sensitivity has a significant correlation with the volume of voids, i.e., void volume. The void volume in the polyolefin film is set to fall within the range of from 10 cc to smaller than 40 cc per 100 g of the film. If the void volume is smaller than 10 cc per 100 g of the film, the film will have deteriorated heat-insulating and cushioning properties, so that it becomes difficult to obtain good images and the film will have low opacifying power. In contrast, with increasing the void volume, the film will have better cushioning and heat-insulating properties, so that it becomes possible to obtain good images and the film will have high opacifying power; however, if the void volume is not smaller than 40 cc per 100 g of the film, the film will have low delamination resistance and low elasticity.

The void-containing polyolefin film as used herein can be obtained by the following process. A polyolefin is mixed with a substance incompatible with the polyolefin, and the mixture is melt extruded to obtain an unoriented film, followed by successive biaxial stretching, during which the substance incompatible with the polyolefin serves as a core and a void is formed around the core in the direction of stretching. At that time, with a higher degree of stretching or a lower temperature of stretching, the volume of voids formed has a tendency to increase. In view of this fact, the amount of incompatible substance to be added, the degree of stretching, and the temperature of stretching are adjusted so that the void volume falls within the above range.

The use of polyolefins is advantageous in that there is no evolution of chlorine gas at the time of incineration and from an economical point of view. The polyolefin which can be used may include polyethylene, polypropylene, and polybutene, including their copolymers and their mixtures. Preferred is polypropylene because of its appropriate cushioning properties, ease of film preparation, stability at high temperatures, no evolution of chlorine gas at the time of incineration, and from an economical point of view.

As the substance incompatible with the above polyolefin, there can be used inorganic fine particles or polymers, incompatible with the polyolefin. The use of inorganic fine particles is preferred in that the formation of voids is easily caused and they are available at a low price. The inorganic fine particles may be of calcium carbonate, calcium oxide, silica, titanium oxide, alumina, aluminum sulfate, or others. Particularly preferred is calcium carbonate. The mean particle size of these inorganic substances is within the range of from 0.1 to 15 μm, preferably 0.5 to 10 μm. If the mean particle size is smaller than 0.1 μm, the formation of voids will become difficult over the whole region from the surface to the inside of a stretched film. In contrast, if the mean particle size is larger than 15 μm, the stretching properties at the time of film preparation will become deteriorated. The mixing amount of the inorganic fine particles relative to the polyolefin is within the range of from 2% to 30% by weight, preferably from 4% to 10% by weight. If the mixing amount of inorganic fine particles is lower than 2% by weight, almost no voids will be formed in the stretched film and the void volume will therefore become too low. In contrast, the mixing amount of inorganic fine particles is higher than 30% by weight, the stretching properties at the time of film preparation will be deteriorated.

In the preparation of a polyolefin film, for example, titanium oxide may be added to the film for the purpose of adjusting the whiteness and opacifying power of the film. The incorporation of other additives can also be allowed, such as stabilizing agents, antistatic agents, dyes, and pigments, to such an extent that the properties of the resulting polyolefin film are not deteriorated. The polyolefin film may be coated with antistatic agents or others.

The polyolefin film may preferably have a void-containing portion of at least 4 μm in thickness. In cases where the polyolefin film is composed only of a void-containing portion, it is preferably 30 to 300 μm in thickness. In cases where the polyolefin film is composed of a no-void-containing portion (i.e., core portion) and a void-containing portion, it is about 25 to 300 μm in thickness, in which the void-containing portion may have a thickness of at least 4 μm.

The polyolefin film thus formed is usually used as a substrate for thermal recording media, and a thermosensitive recording layer is disposed directly on the substrate. If the polyolefin film has poor adhesion to the thermosensitive recording layer, an intermediate layer may be interposed between them, such as an anchor coat layer or an adhesive layer. If the polyolefin film has low elasticity, a core layer may be disposed on the back thereof.

On the substrate thus obtained, a thermosensitive recording layer is disposed. The thermosensitive recording layer may contain any combination of a color-forming agent and a color-developing agent, so long as both agents can be brought into contact to cause color development reaction. For example, there can be exemplified combinations of colorless or pale white basic dyes and inorganic or organic acidic substances; and higher fatty acid metal salts, such as ferric stearate, and phenols, such as gallic acid. Also applied are combinations of diazonium salts, couplers, and basic substances.

The basic dyes (color-forming agents) and color-developing agents can also be used in any combination of two or more agents, if necessary. The ratio of basic dyes and color-developing agents to be used, although it is not particularly limited, may be suitably determined according to their kinds. In ordinary cases, color-developing agents are used at an amount of from about 1 to 20 parts by weight, preferably from about 2 to 10 parts by weight, relative to 1 part by weight of basic dyes.

In the thermal recording media of the present invention, the process of forming a thermosensitive recording layer is not particularly limited, and the thermosensitive recording layer may be formed by the process in which a coating is applied to the substrate by air knife coating, blade coating, or any other technique, followed by drying. The application amount of coating is not particularly limited, and it is usually adjusted within the range of from about 2 to 12 g/m$^2$, preferably from about 3 to 10 g/m$^2$, by dry weight.

The thermal recording media of the present invention may further be modified by various techniques well known in the field of production that deals with thermal recording media, for example, an overcoat layer may be disposed on the thermosensitive recording layer for the purpose of protecting the recording layer, or the back of thermal recording media may be treated with an adhesive to make them into adhesive labels.

EXAMPLES

The present invention will be further illustrated by the following working examples; however, the present invention is, of course, not limited to these examples. Unless otherwise indicated, "part(s)" and "%" used in these examples mean "part(s) by weight" and "% by weight", respectively.

The methods of measurement for various items of measurement in the working examples are as follows:

(1) Opacifying power

According to JIS K 6714, the total light transmittance was measured. Samples with higher transmittance were evaluated to have lower opacifying power, whereas samples with lower transmittance were evaluated to have higher opacifying power.

The evaluation of opacifying power in the working examples was carried out on the following criteria.

The total light transmittance is lower than 15%: ⊚ from 15% to lower than 20%: ○ from 20% to lower than 25%: Δ

25% or higher: x (2) Delamination resistance

The evaluation of delamination resistance was carried out by the use of cellophane adhesive tape (available from Sekisui Chemical Co., Ltd.; hereinafter referred to as "cellotape").

The end of cellotape is stuck fast on the surface of a polyolefin film with the pressure of fingers. The film is fixed with fingers and the cellotape is peeled at an angle of 90° from one end thereof at a speed of 2 cm/sec. The amount of film sticking on the cellotape is evaluated by visual observation.

No film sticking on the cellotape: ⊚

Thin film partly sticking on the cellotape: ○

Thin film sticking over the cellotape: Δ

Thick film sticking over the cellotape: x (3) Void volume

The volume of voids present in 100 g of polyolefin film is calculated by the following equation:

$$\text{Void volume} = 100 \times \left( \frac{1}{D} - \frac{\sum M_i / \rho_i}{100} \right)$$

wherein $M_i$ is the mixing ratio of each material (%), $\rho_i$ is the density of each material, and D is the apparent density of the stretched film.

(4) Evaluation of image quality

The images recorded with a practical video printer (model UP-103, available from Sony Corp.) were measured with a Macbeth-type densitometer (model RD-914, available from Macbeth Corp.), and the printed parts with a printing density of about 0.6 were evaluated as follows:

The recorded parts were divided into three-valued parts, i.e., high-density parts, low-density parts, and blank parts, with a dot analyzer (model DA-2000, available from Kanzaki Paper Manufacturing Co., Ltd.), and the ratio of high-density parts was counted.

The ratio of high-density parts is

30% or more: ⊚ from 20% to less than 30%: ○ from 10% to less than 20%: Δ less than 10%: x (The results were very close to the evaluation by visual observation, and better image quality was given at the higher ratio of high-density parts)

(5) Evaluation of elasticity

Young's modulus was measured in the machine direction (MD) and in the transverse direction (TD) according to ASTM D882, and the evaluation of elasticity was made as follows:

140 or higher in MD and 200 or higher in TD: ⊚ from 120 to lower than 140 in MD and from 170 to lower than 200 in TD: ○ from 100 to lower than 120 in MD and from 140 to lower than 170 in TD: Δ lower than 100 in MD and lower than 140 in TD: x

The coating, which is to be applied to the surface of a substrate to form a thermosensitive recording layer, was prepared as follows:

(1) Preparation of solution A 3-(N-ethyl-N-isoamylamino)-6-methyl-7-phenylaminofluoran 10 parts dibenzyl terephthalate 20 parts 5% aqueous solution of methylcellulose 20 parts water 40 parts This composition was pulverized with a sand mill until the mean particle size became to 3 μm.

(2) Preparation of solution B 4,4'-isopropylydenediphenol 30 parts

5% aqueous solution of methylcellulose 40 parts water 20 parts

This composition was pulverized with a sand mill until the mean particle size became to 3 μm.

(3) Preparation of coating

A coating was prepared by mixing 90 parts of solution A, 90 parts of solution B, 30 parts of silicon oxide pigment, 300 parts of 10% aqueous solution of polyvinyl alcohol, and 28 parts of water, and stirring the mixture

Example 1

A mixture of 79% polypropylene with a melt index of 3, 10% high-density polyethylene with a melt index of 0.5, 8% calcium carbonate with a mean particle size of 5 μm, and 3% titanium oxide was melt extruded at 270° C., followed by cooling and then successive biaxial stretching, which gave a void-containing polyolefin film with a thickness of 100 μm. At that time polyolefin films with different void volumes were prepared by changing the stretching conditions. The relationships between the void volume and the delamination resistance, light transmittance (opacifying power), or elasticity of the films obtained are shown in Table 1.

The above polyolefin films were each provided with an anchor coat layer by applying an aqueous coating solution containing a polyethyleneimine anchor material mixed with silica as a blocking inhibitor to the films. To each anchor coat layer was applied a coating solution for thermosensitive recording, which had been prepared as described above, to such an extent that the application amount after drying became to 5 g/m². The films were dried and then subjected to super calendering, resulting in several thermal recording media.

The thermal recording media thus obtained were evaluated for image quality. The results are shown in Table 1. The thermal recording media for comparison were obtained and evaluated in the same manner as in the above example, except that paper or a polyester film (opaque PET) was as used as a substrate. The results of evaluation are also shown in Table 1.

TABLE 1

| No. | 1 | 2 | 3 | 4 | 5 | 6 | 7 |
|---|---|---|---|---|---|---|---|
| Void volume (cc/100 g) | 5 | 15 | 30 | 45 | 60 | (paper) | (opaque PET) |
| Image quality | X | ○ | ○ | ⊚ | ⊚ | X | X |
| Delamination resistance | ⊚ | ⊚ | ○ | X | X | Δ | ⊚ |
| Opacifying power | Δ | ○ | ○ | ⊚ | ⊚ | ⊚ | ○ |
| Elasticity | ⊚ | ⊚ | ○ | Δ | Δ | ⊚ | ⊚ |

Example 2

A mixture of 4% polystyrene, 4% titanium oxide, both of which were set at the constant ratio, and polypropylene with a melt index of 2, calcium carbonate with a mean particle size of 5 μm, both of which were set at different ratios, was melt extruded at 270° C., followed by cooling and successive biaxial stretching, which gave several void-containing polyolefin films with a thickness of 70 μm. These films were evaluated in the same manner as in Example 1. The results are shown in Table 2.

TABLE 2

| No. | 8 | 9 | 10 | 11 | 12 |
|---|---|---|---|---|---|
| Polypropylene (%) | 90.5 | 88 | 83 | 78 | 72 |
| Calcium carbonate (%) | 1.5 | 4 | 9 | 14 | 20 |
| Void volume (cc/100 g) | 6 | 14 | 35 | 53 | 75 |
| Image quality | X | ○ | ⊚ | ⊚ | ⊚ |
| Delamination resistance | ⊚ | ⊚ | ○ | X | X |
| Opacifying power | Δ | ○ | ⊚ | ⊚ | ⊚ |
| Elasticity | ⊚ | ⊚ | ○ | Δ | Δ |

As can be seen from Tables 1 and 2, the recording media with a void volume of smaller than 10 cc/100 g were insufficient in image quality and in opacifying power, while the recording media with a void volume of 40 cc/100 g or larger were insufficient in delamination resistance and in elasticity. In contrast, the recording media with a void volume of from 10 cc/100 g to smaller than 40 cc/100 g had high image quality and high delamination resistance, which shows, together with opacifying power and elasticity, a good balance of characteristics.

What is claimed is:

1. A thermal recording medium comprising a substrate and a thermosensitive recording layer disposed thereon, wherein the substrate has a void-containing polyolefin film with a void volume of from 15 cc to smaller than 30 cc per 100 g of the film.

2. The thermal recording medium according to claim 1, wherein the polyolefin film is made by preparing an unoriented film composed mainly of a polyolefin and a substance incompatible with the polyolefin and biaxially stretching the unoriented film.

3. The thermal recording medium according to claim 2, wherein the substance incompatible with the polyolefin is composed of inorganic fine particles.

* * * * *